(12) United States Patent
Mao

(10) Patent No.: US 9,337,639 B2
(45) Date of Patent: May 10, 2016

(54) SHIELD GROUNDING DEVICE

(75) Inventor: Jiansheng Mao, Wuxi (CN)

(73) Assignee: ZHENFA ENERGY GROUP CO.,LTD, Yubei District, Chongqing (CN)

( * ) Notice: Subject to any disclaimer, the term of this patent is extended or adjusted under 35 U.S.C. 154(b) by 117 days.

(21) Appl. No.: 14/373,217

(22) PCT Filed: Apr. 17, 2012

(86) PCT No.: PCT/CN2012/074155
§ 371 (c)(1),
(2), (4) Date: Jul. 18, 2014

(87) PCT Pub. No.: WO2013/107117
PCT Pub. Date: Jul. 25, 2013

(65) Prior Publication Data
US 2014/0360747 A1     Dec. 11, 2014

(30) Foreign Application Priority Data

Jan. 19, 2012    (CN) .......................... 2012 1 0017322

(51) Int. Cl.
H01R 4/66    (2006.01)
H02G 7/22    (2006.01)
H01B 5/02    (2006.01)

(52) U.S. Cl.
CPC .. H02G 7/22 (2013.01); H01B 5/02 (2013.01); H01R 4/66 (2013.01)

(58) Field of Classification Search
CPC ......... H02G 7/22; H02G 13/40; H02G 13/00; H02G 13/80; H01B 5/02; E04H 17/20; E04H 17/22; E04H 17/24
USPC ................ 174/2–3, 5 R–7, 135, 51; 361/799; 439/92–108; 256/59
See application file for complete search history.

(56) References Cited

U.S. PATENT DOCUMENTS

| | | | | |
|---|---|---|---|---|
| 6,815,607 | B1 * | 11/2004 | Gingras | ............. E04H 12/2215 174/6 |
| 7,365,267 | B2 * | 4/2008 | Kim | ........................ H01R 4/66 174/3 |
| 8,420,929 | B2 * | 4/2013 | Mundle | .................... H01R 4/66 174/3 |

* cited by examiner

*Primary Examiner* — Angel R Estrada
*Assistant Examiner* — Dimary Lopez Cruz

(57) ABSTRACT

A shield grounding device includes: a grounding angle steel (1); a flat iron (9) mounted on a top portion of the shield grounding device; and a laminated board (5) connected to overground wires; wherein two shield connection boards (2) vertical to each other are respectively connected to two external surfaces of an top end of the grounding angle steel, the shield connection boards are vertically mounted on each other by a locating supporter (3), fixing holes (4) are drilled on the shield connection boards for connecting the flat iron and the laminated board. The device solves problems of conventional grounding devices that a grounding resistance is increased and a grounding effect is poor caused by unstable welding quality of grounding electrodes and the flat iron. Besides, site operation difficulty is sufficiently lowered, labor intensity is decreased, and labor efficiency is increased, in such a manner that a cost is lowered.

14 Claims, 10 Drawing Sheets

SHIELD GROUNDING DEVICE

CROSS REFERENCE OF RELATED APPLICATION

This is a U.S. National Stage under 35 U.S.C 371 of the International Application PCT/CN2012/074155, filed Apr. 17, 2012, which claims priority under 35 U.S.C. 119(a-d) to CN 201210017322.8, filed Jan. 19, 2012.

BACKGROUND OF THE PRESENT INVENTION

1. Field of Invention

The present invention relates to anti-lightning and anti-static devices, and a technical field of safety grounding, and more particularly to a shield grounding device.

2. Description of Related Arts

For most of the conventional grounding devices, grounding electrodes are buried in a pre-dug pit on the scene. The grounding electrode is connected to a laminated board which is connected to overground wires, through a flat iron welded with a top portion thereof, or to other grounding electrodes for forming a grounding frame or a grounding group. The disadvantages are as follows. The flat iron on the grounding electrode is vertically welded instantly. The welding pool is easy to be discontinuous because of being vertical during the vertical welding, which will lead to welding fault, missing welding, rosin joint, etc. However, during site operation of grounding grid, the rosin joint can easily lead to disassembly of the grounding wire steel frame, which increases the grounding resistance and lowers the grounding quality. Furthermore, even parameter requirements of the grounding electrode may not be satisfied. Therefore, the grounding resistance cannot be guaranteed, and the grounding effect is poor. Besides, when all the grounding electrodes are welded to each other through the flat irons, especially when the grounding electrodes form a square-mesh grounding grid, the grounding electrodes and the flat irons outside and inside the grounding frame are longitudinally (vertically) and latitudinally (horizontally) welded with more than three surfaces, which is large in workload, difficult in operation, high in labor intensity, and low in labor efficiency. In addition, during site operation of the conventional grounding device, wiring and welding are carried out manually, which is inefficient, difficult and expensive.

SUMMARY OF THE PRESENT INVENTION

An object of the present invention is to provide a shield grounding device for solving problems of a increased grounding resistance and a poor grounding effect which are caused by unstable welding quality between grounding electrodes and flat irons thereof, while lowering site operation difficulty, decreasing labor intensity, increasing labor efficiency, so as to lower cost.

Accordingly, in order to accomplish the above object, the present invention provides a shield grounding device, comprising:

a grounding angle steel;

a flat iron mounted on a top portion of the shield grounding device; and a laminated board connected to overground wires;

wherein two shield connection boards vertical to each other are respectively connected to two external surfaces of a top end of the grounding angle steel, the shield connection boards are vertically positioned by a locating supporter, fixing holes are drilled on the shield connection boards for connecting the flat iron and the laminated board.

Preferably, the shield connection boards are both square, a side length thereof is at least four times of a width of a flange of the grounding angle steel. Six the fixing holes are drilled on each of the shield connection boards. The six fixing holes comprise four flat iron fixing holes and two laminated board fixing holes. The flat iron is mounted on an external surface of the shield connection board by bolts and nuts through the flat iron fixing holes, and the laminated board is mounted on an internal surface of the shield connection board by bolts and nuts through the laminated board fixing holes; or the flat iron and the laminated board are respectively mounted on an external surface and an internal surface of the shield connection board by bolts and nuts through the flat iron fixing holes. Surface-roughened zinc layers are coated on surfaces of the shield connection board and the flat iron, wherein the zinc layer is a roughened surface in a form of irregular micro hills. A supporting angle steel is mounted on the top end of the grounding angle steel; the supporting angle steel is pieced and welded with the top end of the grounding angle steel. A length of the supporting angle steel equals to the side length of the shield connection board. A streamline protector is welded at a bottom portion of the shield connection board. Whole-length bearing bars are welded with a connecting portion of the flange of the ground angle steel along a length direction.

Compared to conventional grounding devices, advantages of the present invention are as follows. The two shield connection boards vertical to each other are respectively connected to the top portion of the grounding angle steel, and the fixing holes are drilled on the shield connection board. During site operation, the shield connection boards and the fixing holes are connected to grounding wires or the laminated board by bolts and nuts. Or the shield connection boards on the grounding angle steel and the fixing holes on the shield connection boards are connected to other grounding angle steels in any possible forms by bolts and the flat irons, for forming a grounding set, a grounding group, or a grounding grid with any shape as required. On-site vertical welding is no longer needed, and the problems of the increased grounding resistance and the poor grounding effect caused by unstable vertical welding quality are solved. Besides, the site operation difficulty is sufficiently lowered, the labor efficiency is increased, the labor intensity is decreased, and the labor cost is lowered. The surface-roughened zinc layers are coated on the surfaces of the shield connection board and the flat iron; the zinc layer is the roughened surface in the form of the irregular micro hills, which effectively increases a contact area and reduces a contact resistance for further reducing the grounding resistance. In addition, during mechanical pressure injection of the grounding angle steel, the supporting angle steel pieced and welded with the top portion of the grounding angle steel has a sufficient supporting effect, in such a manner that destruction of the ground angle steel and the shield connection board caused by punching and pressing is reduced. The streamline protector is welded at the bottom portion of the shield connection board for protection during the mechanical pressure injection. If depth of the mechanical pressure injection is large, the whole-length bearing bars welded with the connecting portion of the flange of the ground angle steel along the length direction are able to effectively strengthen the ground angle steel.

These and other objectives, features, and advantages of the present invention will become apparent from the following detailed description, the accompanying drawings, and the appended claims.

DETAILED DESCRIPTION OF THE PREFERRED EMBODIMENT

Figure 1:
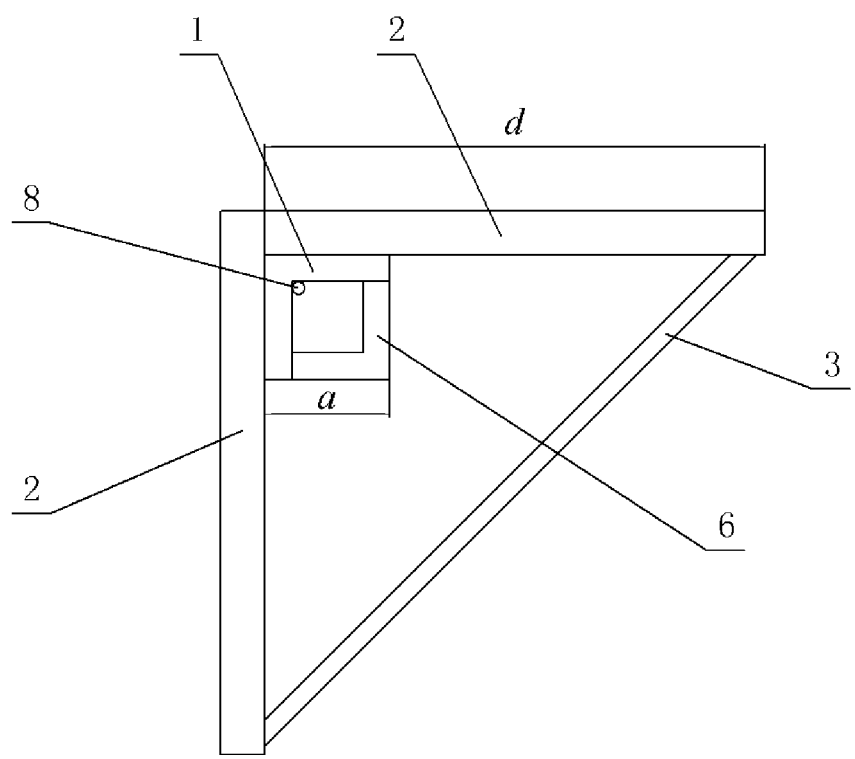
FIG. 1 is a perspective view of a shield grounding device according to the present invention.

A shield grounding device according to a preferred embodiment of the present invention is illustrated, comprising:

a grounding angle steel 1;

a flat iron 9 mounted on a top portion of the shield grounding device; and a laminated board 5 connected to overground wires;

wherein two shield connection boards 2 vertical to each other are respectively connected to two external surfaces of a top end of the grounding angle steel 1; the shield connection boards 2 are vertically positioned by a locating supporter 3; and fixing holes 4 are drilled on the shield connection boards 2 for connecting the flat iron 9 or the laminated board 5.

Figure 2:
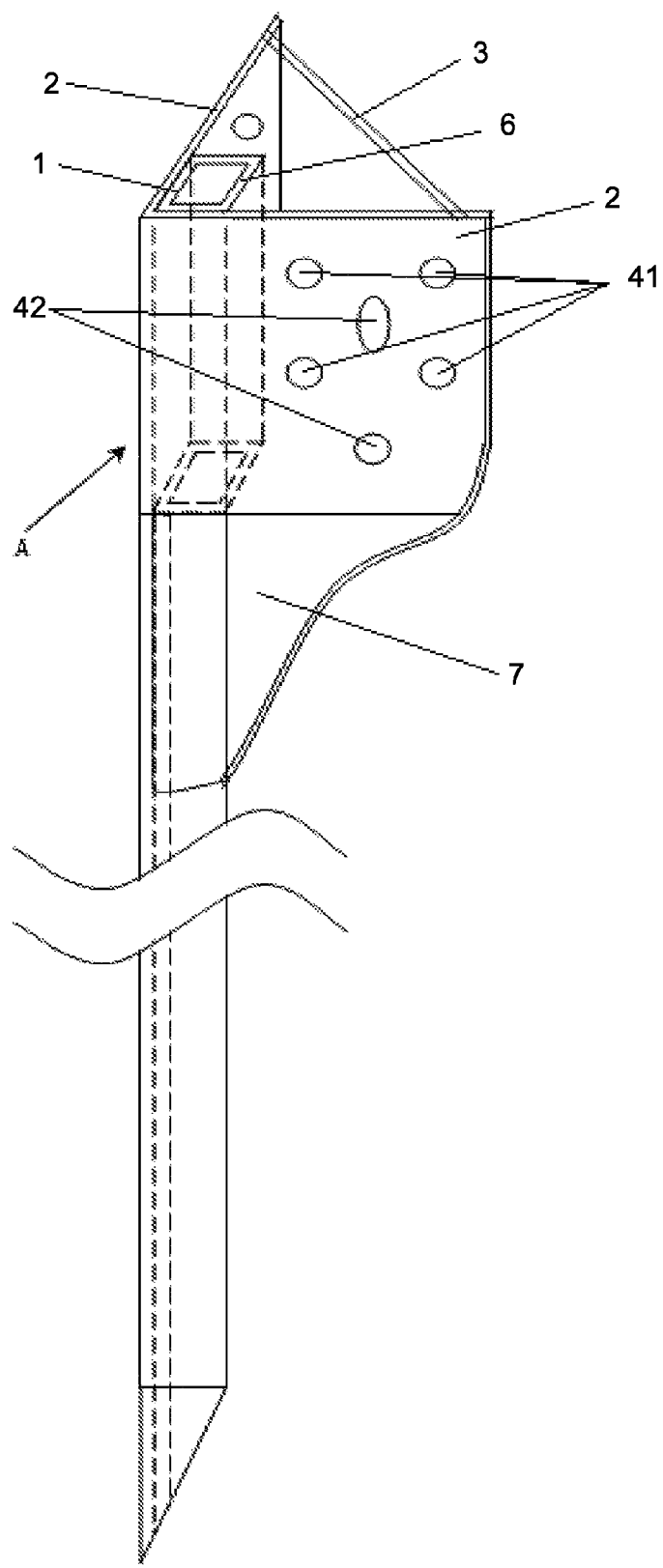
FIG. 2 is a top view of the shield grounding device according to the present invention.
Figure 3:
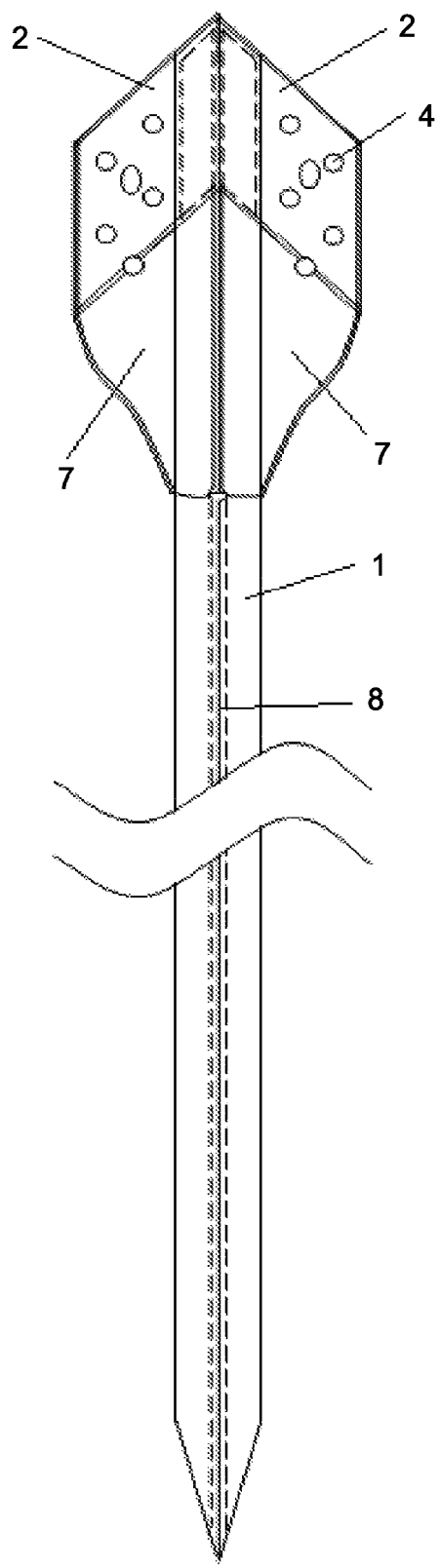
FIG. 3 is an A-direction view of the shield grounding device according to the present invention.
Figure 4:
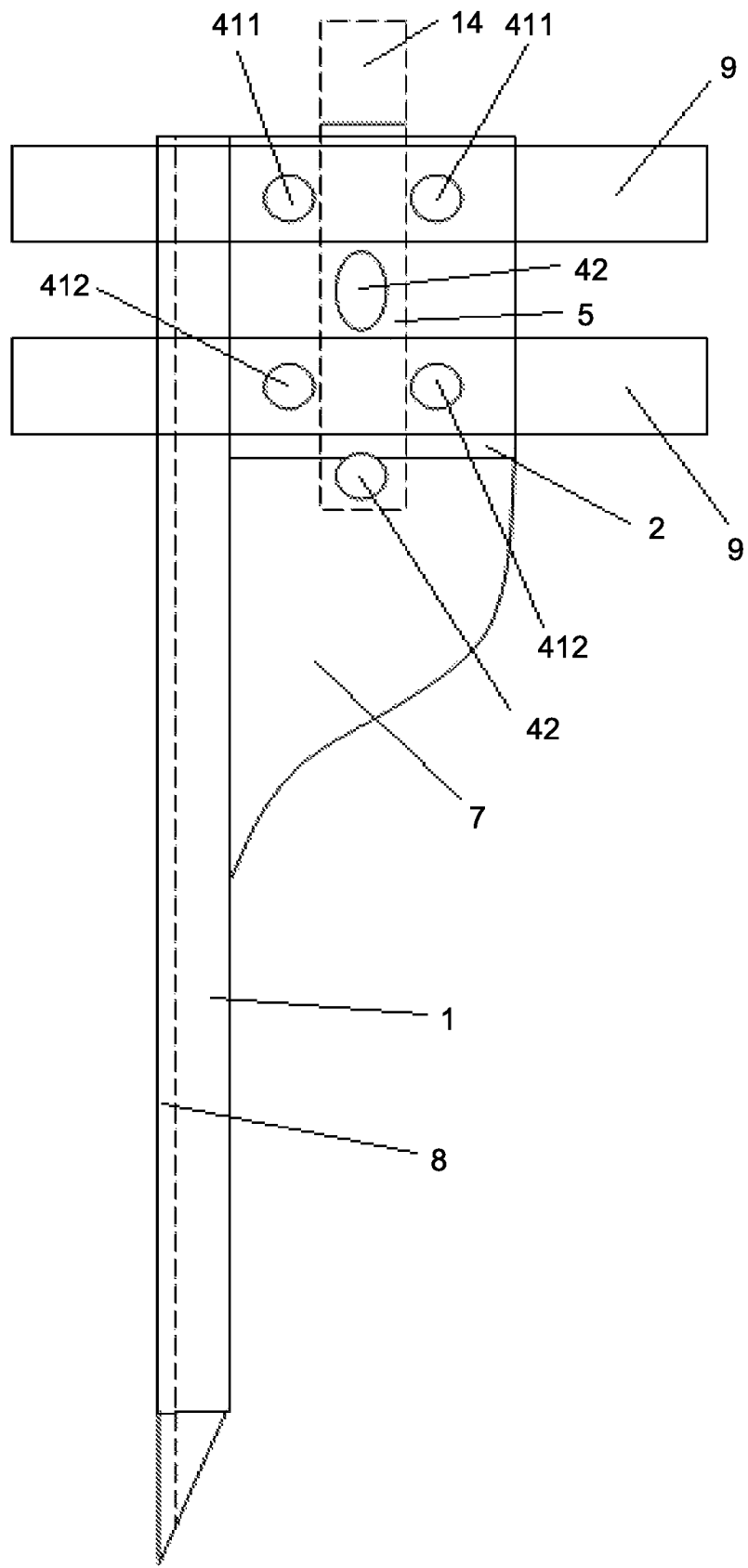
FIG. 4 is a perspective view of a flat iron and a laminated board of the shield grounding device according to the present invention.

Preferably, the shield connection boards 2 are both square, a side length a thereof is at least four times of a width d of a flange of the grounding angle steel 1. Six the fixing holes 4 are drilled on each of the shield connection boards 2. The fixing holes are respectively four flat iron fixing holes 41 and two laminated board fixing holes 42, wherein the flat iron fixing holes 41 comprise upper fixing holes 411 and lower fixing holes 412 (illustrated in FIGS. 1-3). The flat iron 9 is mounted on an external surface of the shield connection board 2 by bolts and nuts through the flat iron fixing holes 41; the laminated board 5 is mounted on an internal surface of the shield connection board 2 by bolts and nuts through the laminated board fixing holes 42 (illustrated in FIG. 4, wherein a grounding wire is marked as 14); or the flat iron 9 and the laminated board 5 are respectively mounted on an external surface and an internal surface of the shield connection board 2 by bolts and nuts through the flat iron fixing holes 41. Surface-roughened zinc layers are coated on surfaces of the shield connection board 2 and the flat iron 9, the zinc layer is a roughened surface in a form of irregular micro hills. A supporting angle steel 6 is mounted on the top end of the grounding angle steel 1, the supporting angle steel 6 is pieced and welded with the top end of the grounding angle steel 1. A length of the supporting angle steel 6 equals to the side length a of the shield connection board 2. A streamline protector 7 is welded at a bottom portion of the shield connection board 2. Whole-length bearing bars 8 are welded with a connecting portion of the flange of the ground angle steel 1 along a length direction.

Figure 5:
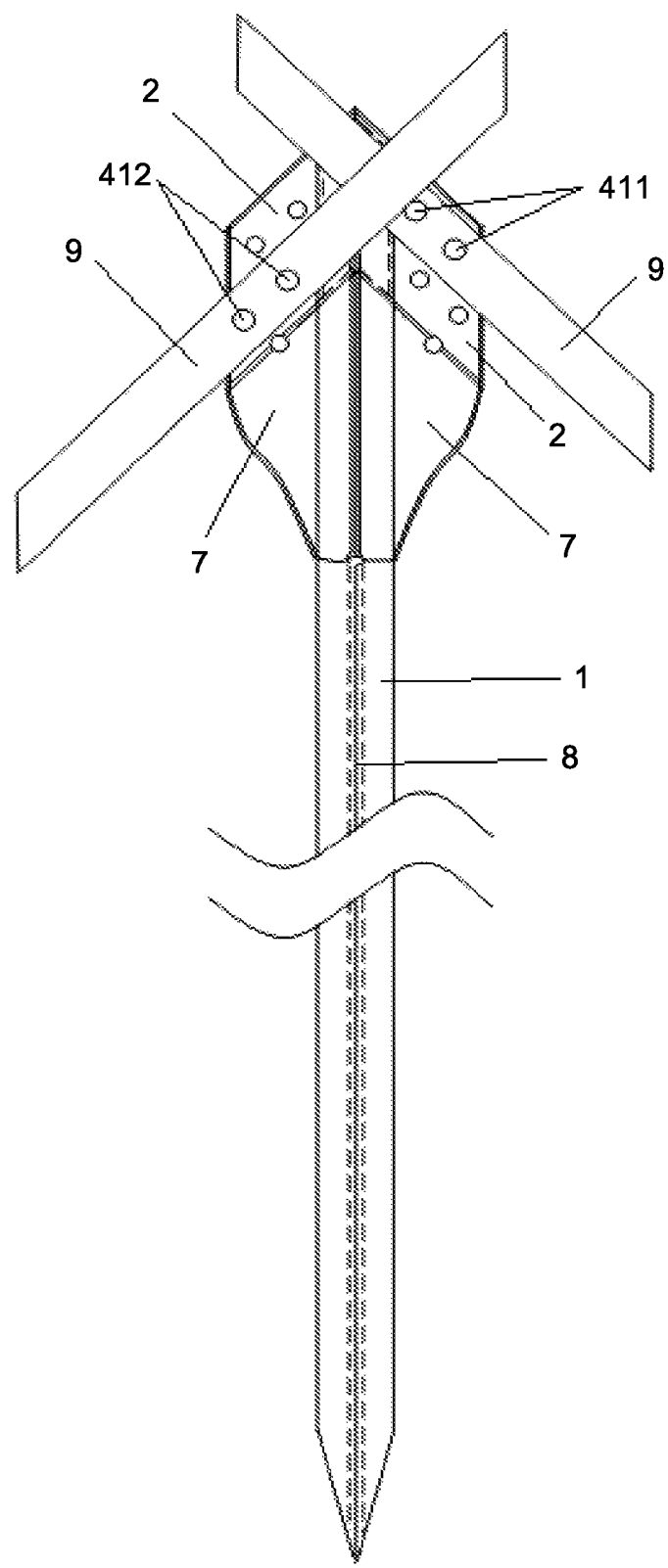
FIG. 5 is a perspective view of a connection structure of the shield grounding device and the flat iron according to the present invention.
Figure 6:
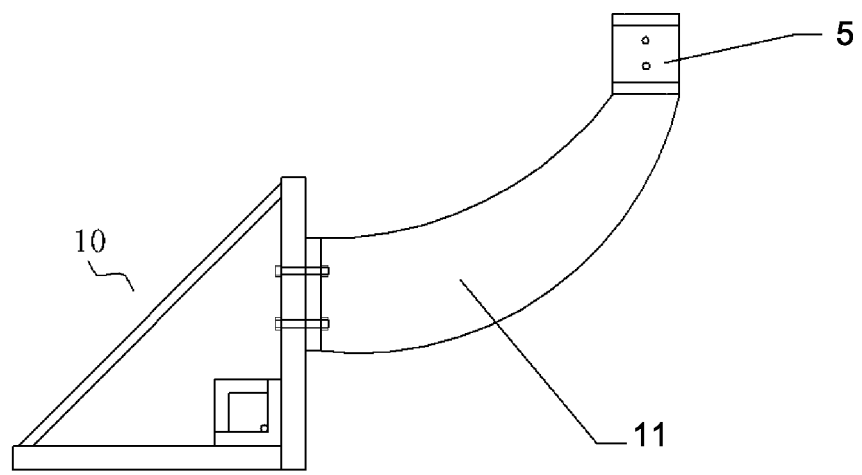
FIG. 6 is a top view of one installed shield grounding device according to the present invention.
Figure 7:
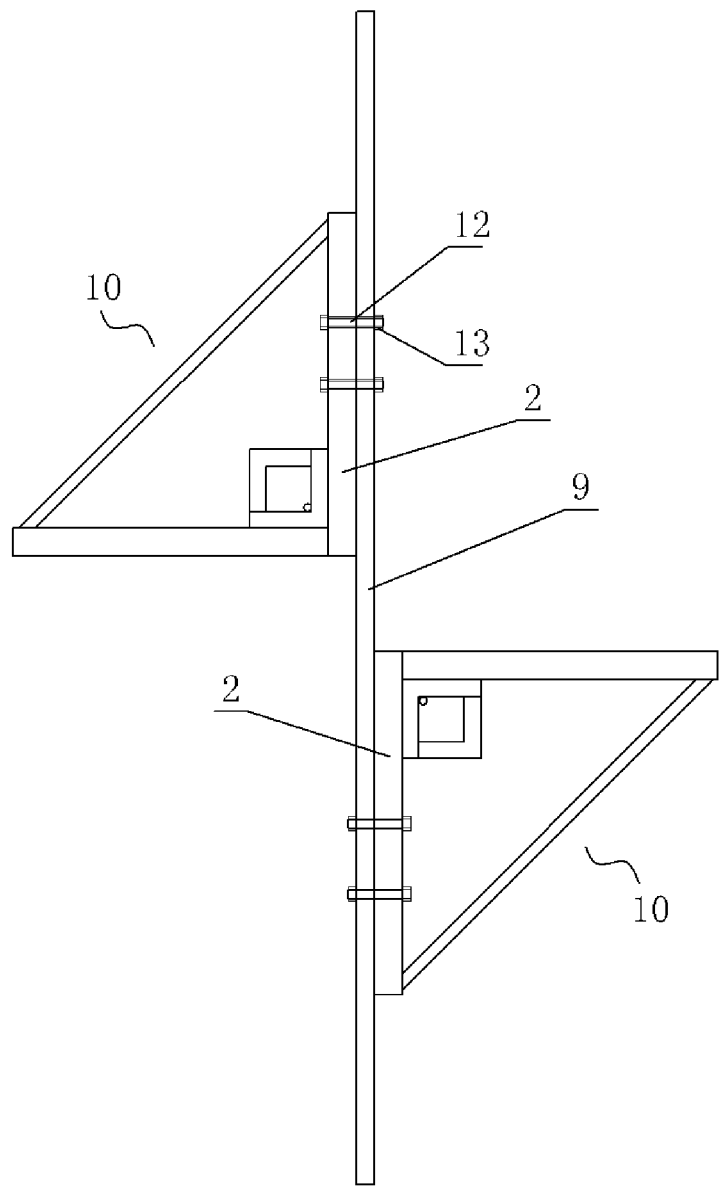
FIG. 7 is a top view of two installed shield grounding devices according to the present invention.
Figure 8:
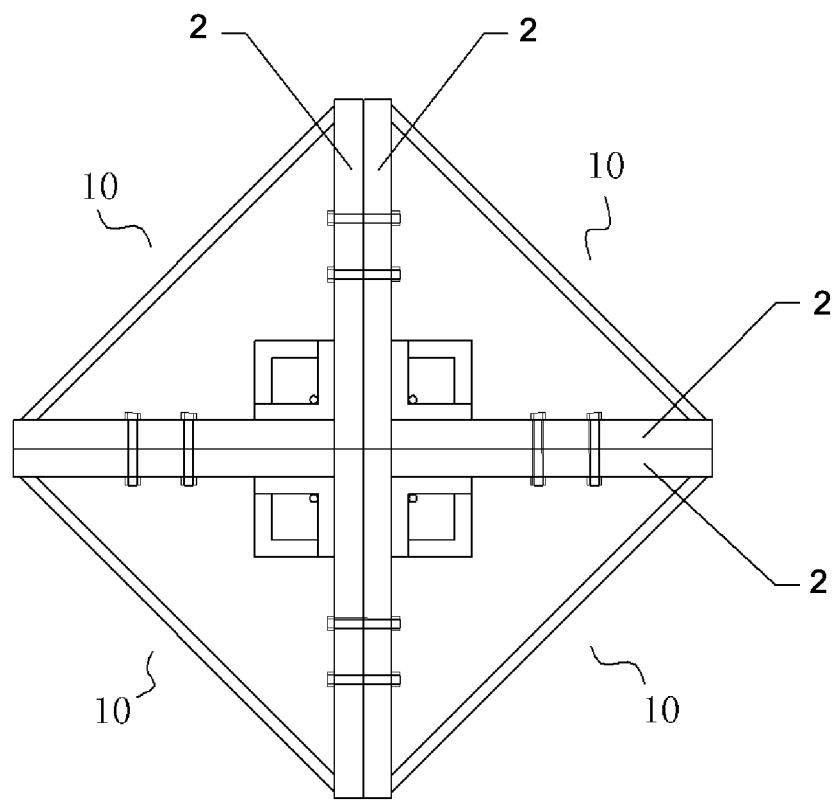
FIG. 8 is a top view of four installed shield grounding devices according to the present invention.
Figure 9:
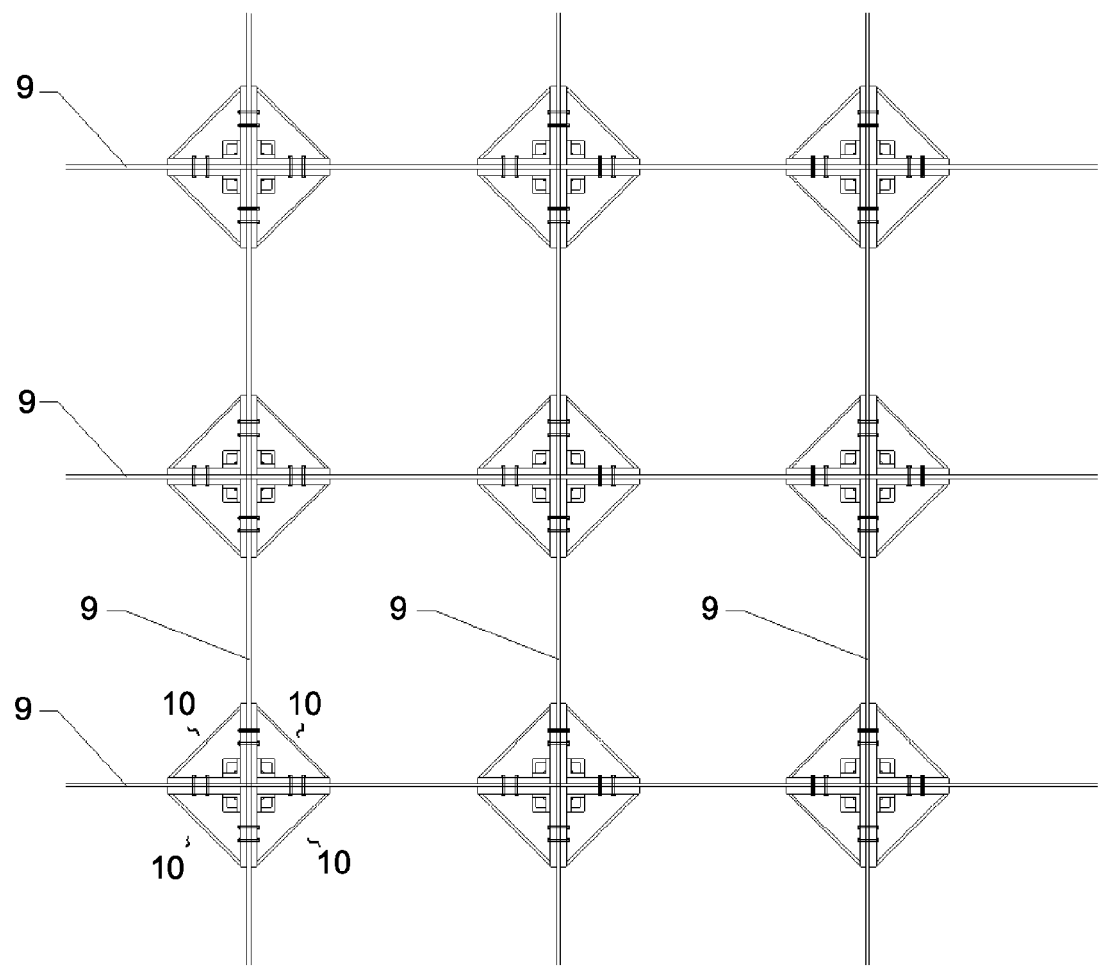
FIG. 9 is a top view of a plurality of the four installed shield grounding devices of FIG. 8 which form a square-mesh grounding grid according to the present invention.
Figure 10:
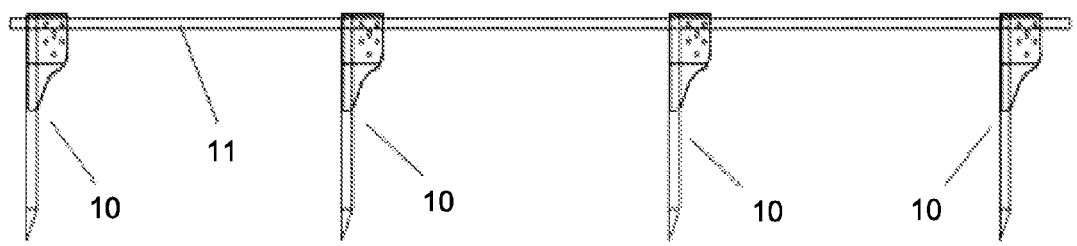
FIG. 10 is a perspective view of the shield grounding device connected to a grounding wire according to the present invention.

According to the present invention, the shield grounding device is able to be installed singly or plurally according to local installation and utilization requirements. When the single shield grounding device is connected to the ground, the shield connection board 2 is directly connected to the grounding wire 11 and the laminated board 5 (illustrated in FIG. 6). When a plurality of the shield grounding devices are connected by the flat irons 9, the shield connection boards on the top portion of the ground angel steel 1 are mounted with the flat iron 9 by the bolts and the nuts through the fixing holes 4; then, the grounding angle steel 1 is horizontally welded with a top of the flat iron 9 for lowering the grounding resistance. When connecting the shield connection board 2 and the flat irons 9 with the bolts (illustrated in FIG. 4, wherein the grounding wire is marked as 14), the flat irons in two directions are respectively mounted by the upper fixing holes 411 and the lower fixing holes 412 on the shield connection board 2 for mounting the flat irons in a crisscross form (illustrated in FIG. 5). If the flat irons are not going to be mounted in the crisscross form or the flat irons are made of segments, four the fixing holes 41 are utilized for mounting one same flat iron for suiting different installation methods. In practice, for effectively lowering the grounding resistance, a plurality of the devices according to the present invention are connected to each other as a whole, wherein the flat iron 9 for connecting is mounted between the shield connection boards of the two neighboring shield grounding devices 10 by bolts and nuts (illustrated in FIG. 7). Or four the shield grounding devices 10 are connected to each other directly by bolts and nuts (illustrated in FIG. 8). When a plurality of the shield grounding devices are required for forming a square-mesh grounding grid, four the shield grounding devices are connected as a whole by the flat irons 9 (illustrated in FIG. 9); or three or one of the shield grounding devices is selected for forming a ground grid, wherein combining a plurality of the shield grounding device as a whole is able to lower the ground resistance. Alternatively, the grounding wire 11 is respectively connected to each of the shield grounding devices (illustrated in FIG. 10).

The device of the present invention is able to bear pressure (i.e. ground squeeze injection) directly applied from the top by a mechanical equipment (presser) for piling. For a grounding group, a shallow trench is dug on site, and each grounding electrode is pressed into the ground by injection, then the grounding electrodes are connected by the flat irons and the grounding wires in a laminated board form. A mechanical construction method of the device of the present invention comprises steps of: judging whether soil resistivity satisfies grounding requirements before construction, directly pressing the shield grounding device into the ground by a mechanical method if the requirement are satisfied, and utilizing a grounding electrode (rod) for equipotential discharge; utilizing resistant reducing agent for construction if the requirements are not satisfied, wherein a pit satisfying the grounding requirements are formed by mechanically pressing at first, then the resistance reducing agent is filled and compacted into the pit for the grounding electrode, and finally the shield grounding device is pressed into the pit filled and compacted with the resistance reducing agent at last, in such a manner that a sufficient and high-class grounding wire device is formed.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A shield grounding device, comprising:
   a grounding angle steel;
   a flat iron mounted on a top portion of said shield grounding device; and
   a laminated board connected to overground wires;
   wherein two shield connection boards vertical to each other are respectively connected to two external surfaces of a top end of said grounding angle steel, said shield connection boards are vertically positioned by a locating supporter, fixing holes are drilled on said shield connection boards for connecting said flat iron and said laminated board.

2. The device, as recited in claim 1, wherein said shield connection boards are both square, a side length thereof is at least four times of a width of a flange of said grounding angle steel.

3. The device, as recited in claim 1, wherein six said fixing holes are drilled on each of said shield connection boards.

4. The device, as recited in claim 2, wherein six said fixing holes are drilled on each of said shield connection boards.

5. The device, as recited in claim 3, wherein said fixing holes comprise four flat iron fixing holes and two laminated board fixing holes.

6. The device, as recited in claim 4, wherein said fixing holes comprise four flat iron fixing holes and two laminated board fixing holes.

7. The device, as recited in claim 5, wherein said flat iron is mounted on an external surface of said shield connection board by bolts and nuts through said flat iron fixing holes, said laminated board is mounted on an internal surface of said shield connection board by bolts and nuts through said laminated board fixing holes.

8. The device, as recited in claim 6, wherein said flat iron is mounted on an external surface of said shield connection board by bolts and nuts through said flat iron fixing holes, said laminated board is mounted on an internal surface of said shield connection board by bolts and nuts through said laminated board fixing holes.

9. The device, as recited in claim 5, wherein said flat iron and said laminated board are respectively mounted on an external surface and an internal surface of said shield connection board by bolts and nuts through said flat iron fixing holes.

10. The device, as recited in claim 6, wherein said flat iron and said laminated board are respectively mounted on an external surface and an internal surface of said shield connection board by bolts and nuts through said flat iron fixing holes.

11. The device, as recited in claim 1, wherein surface-roughened zinc layers are coated on surfaces of said shield connection board and said flat iron, said zinc layer is a roughened surface in a form of irregular micro hills.

12. The device, as recited in claim 1, wherein a supporting angle steel is mounted on said top end of said grounding angle steel, said supporting angle steel is pieced and welded with said top end of said grounding angle steel; a length of said supporting angle steel equals to a side length of said shield connection board.

13. The device, as recited in claim 1, wherein a streamline protector is welded at a bottom portion of said shield connection board.

14. The device, as recited in claim 1, wherein whole-length bearing bars are welded with a connecting portion of a flange of said ground angle steel along a length direction.

\* \* \* \* \*